United States Patent [19]

Nakagome et al.

[11] 4,131,915

[45] Dec. 26, 1978

[54] FACSIMILE SIGNAL TRANSMISSION SYSTEM

[75] Inventors: Yukio Nakagome, Yokohama; Hiroichi Teramura, Tokyo; Yasuhiro Yamazaki, Hiratsuka; Yasushi Wakahara, Tokyo, all of Japan

[73] Assignee: Kokusai Denshin Denwa Kabushiki Kaisha, Japan

[21] Appl. No.: 732,597

[22] Filed: Oct. 15, 1976

[30] Foreign Application Priority Data

Oct. 16, 1975 [JP] Japan .............................. 50/124716

[51] Int. Cl.² .......................................... H04N 7/12
[52] U.S. Cl. .................................. 358/260; 358/261; 179/15 BD
[58] Field of Search ................... 358/260, 261, 263; 179/15 PD, 15 AF

[56] References Cited

U.S. PATENT DOCUMENTS 3,974,326  8/1976  Rosdolsky et al. ................. 358/263

Primary Examiner—Robert L. Griffin
Assistant Examiner—Edward L. Coles
Attorney, Agent, or Firm—Robert E. Burns; Emmanuel J. Lobato; Bruce L. Adams

[57] ABSTRACT

A facsimile signal transmission system, in which a coder is provided for coding an input facsimile signal for each information block of picture elements on a predetermined number of scanning lines. A counter is provided for counting the number of bits of each coded output corresponding to the picture elements of the predetermined number of scanning lines. Dummy codes are added to the coded output of the coder to increase the number of bits of the coded output to be larger than a reference bit number predetermined in consideration of the subscanning time at the receiving side in a case where the count result of the counter is smaller than the reference bit number.

2 Claims, 3 Drawing Figures

FACSIMILE SIGNAL TRANSMISSION SYSTEM

This invention relates to a facsimile signal transmission system having the function of matching between a subscanning speed and a signal transmission speed.

In a coding system aimed at shortening of the time for transmission of facsimile signals, there occurs a phenomenon of mismatching between the subscanning speed and the transmission speed, that is, phenomenon that since the code compression ratio is so high and the speed of subscanning involving a mechanical operation is lower than the coding or decoding speed, subscanning cannot follow up the coding speed. A conventional solution of this problem, heretofore proposed, is as follows: an output buffer memory is provided after a coding section and a variable scanning speed system using a pulse motor for subscanning drive is employed, and when the amount of information stored in the output buffer memory exceeds a certain large reference value, subscanning is interrupted; when the abovesaid amount of information becomes smaller than another certain smaller reference value, subscanning is carried out to resume the coding; and when the amount of information stored in the output buffer memory becomes zero, dummy codes are delivered out.

In this system, however in order to avoid as much as possible that the amount of information in the output buffer memory becomes zero, the number of bits, when coding a facsimile signal of, for example, one line, is sometimes very small, so that the smaller reference value for resuming subscanning is appreciably large (for example, about 2000 bits). Further, if the number of output bits after coding is large, the output buffer memory is required to have a storage capacity of about two scanning lines for preventing an overflow from the buffer memory. Thus, the conventional method is defective in that a memory of a large capacity (for example, about 8000 bits) is required as the output buffer memory and that its control is complicated.

An object of this invention is to provide a facsimile signal transmission system in which after information of a predetermined number (hereinafter assumed to be x) of scanning lines is coded, when the number of coded bits is smaller than the number of transmission bits to be transmitted in the subscanning time for the abovesaid number of scanning lines, dummy codes are added, whereby the capacity of the buffer memory on the output side can be remarkedly reduced.

According to the invention, there is provided a facsimile signal transmission system comprising: a coder for coding an input fascimile signal for each information block of picture elements on a predetermined number of scanning lines, counting means for counting the number of bits of each coded output corresponding to the picture elements of the predetermined number of scanning lines, and dummy code adding means for adding dummy codes to the coded output to increase the number of bits of the coded output to be larger than a reference bit number predetermined in consideration of the subscanning time at the receiving side in a case where the count result of counting of the counting means is smaller than the reference bit number.

Figure 1:
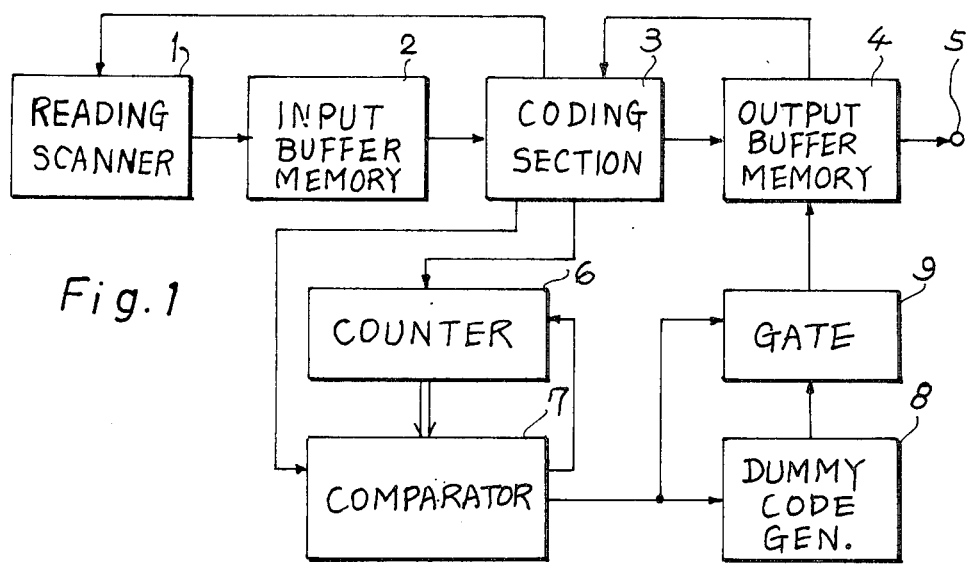
FIG. 1 is a block diagram illustrating an embodiment of this invention.

With reference to FIG. 1, an embodiment of this invention will be described. Reference numeral 1 indicates a reading scanner for reading out facsimile signals from an original picture or the like to be transmitted by variable-speed subscanning; 2 designates an input buffer memory for temporarily storing the read-out facsimile signals; 3 identifies a coding section for sequentially coding picture element blocks or run lengths of an appropriate number of picture elements determined in accordance with the algorithm of coding the facsimile signals stored in the input buffer memory 2; 4 designates an output buffer memory for storing the facsimile signals encoded by the coding section 3 and delivering out the same to an output terminal 5 at a constant bit rate; and 6 represents a counter of counting the number of coded bits derived from the coding section 3. Reference numeral 7 shows a comparator which upon completion of coding of the facsimile signals of a predetermined number (x) of scanning lines, compares the content of the counter 6 with a predetermined number, and then resets the counter 6 to zero, and if the content of the counter 6 is smaller than the predetermined number (which will hereinafter be taken as y), the comparator 7 applies a number of pulses corresponding to a difference between the compared values to a dummy code generator 8 and a gate 9 described later. Reference numeral 8 refers to the dummy code generator which, at each input pulse from the comparator 7, delivers out bit by bit a predetermined pattern, for example, a train of "0", or a dummy code of a pattern which does not appear in the output of the coding section 3. Reference numeral 9 indicates the gate for writing the output from the dummy code generator 8 in the output buffer memory 4 by the output pulse of the comparator 7.

The operation of the embodiment shown in FIG. 1 is as follows: A facsimile picture is scanned by the reading scanner 1 for obtaining a facsimile signal of time serial configuration or format, and this subscanning is achieved by variable-speed driving. The facsimile signal of each scanning line read out by the reading scanner 1 is temporarily stored in the input buffer memory 2. When the amount of information stored in the output buffer memory 4 has been reduced to, for example, one bit, the coding section 3 immediately operates to complete one coding operation, for example, one run length coding operation in the run length coding, before the amount of information stored in the output buffer memory 4 is reduced to zero bits, and then delivers out the result of the operation to the output buffer memory 4. The number of coded bits of the output from the coding section 3, in this case, is counted by the counter 6. Further, the coding section 3 generates a pulse to the reading scanner 1 at each completion of coding of the information of each scanning line, and the reading scanner 1 reads out information of one scanning line from the original picture. Moreover, the coding section 3 generates one pulse to the comparator 7 at each completion of coding of facsimile signals of a predetermined number (a number such, for example, as one, two, four, eight . . ., which has already been indicated by x) of scanning lines. When supplied with the pulse from the coding section 3, the comparator 7 compares the content of the counter 6, i.e. the number of output bits coded until then, with the predetermined number y. As a result of the comparison operation, if the content of the counter 6 (which content will hereinafter be referred to as Z) is larger than the predetermined number, that is, $Z \geq y$, the counter 6 is cleared to zero. However, if the content of the counter 6 is less than the predetermined number, that is, $Z \leq y$, the comparator 7 supplies to the dummy code generator 8 and the gate 9 pulses equal in number to the difference (y - Z). The dummy code generator 8, at each input thereto of one pulse, generates bit by bit a predetermined pattern, for example, a train of "0", or codes which do not appear at the output of the coding section 3. The predetermined number y, which is compared with the content of the counter 6 in the comparator 7, is a number which is determined by the subscanning time of a receiver (which subscanning time is equal to the time from start to completion of one subscanning such as recording, paper feeding, etc.) and the transmission bit rate. This number y is equal to the number of transmission bits which are transmitted during the period of time necessary for completing subscanning at the receiver by a number of scanning lines until the coder 3 applies pulses to the comparator 7. This is expressed by the following equation: y = x × (time necessary for one subscanning) × (transmission bit rate)

Figure 2:
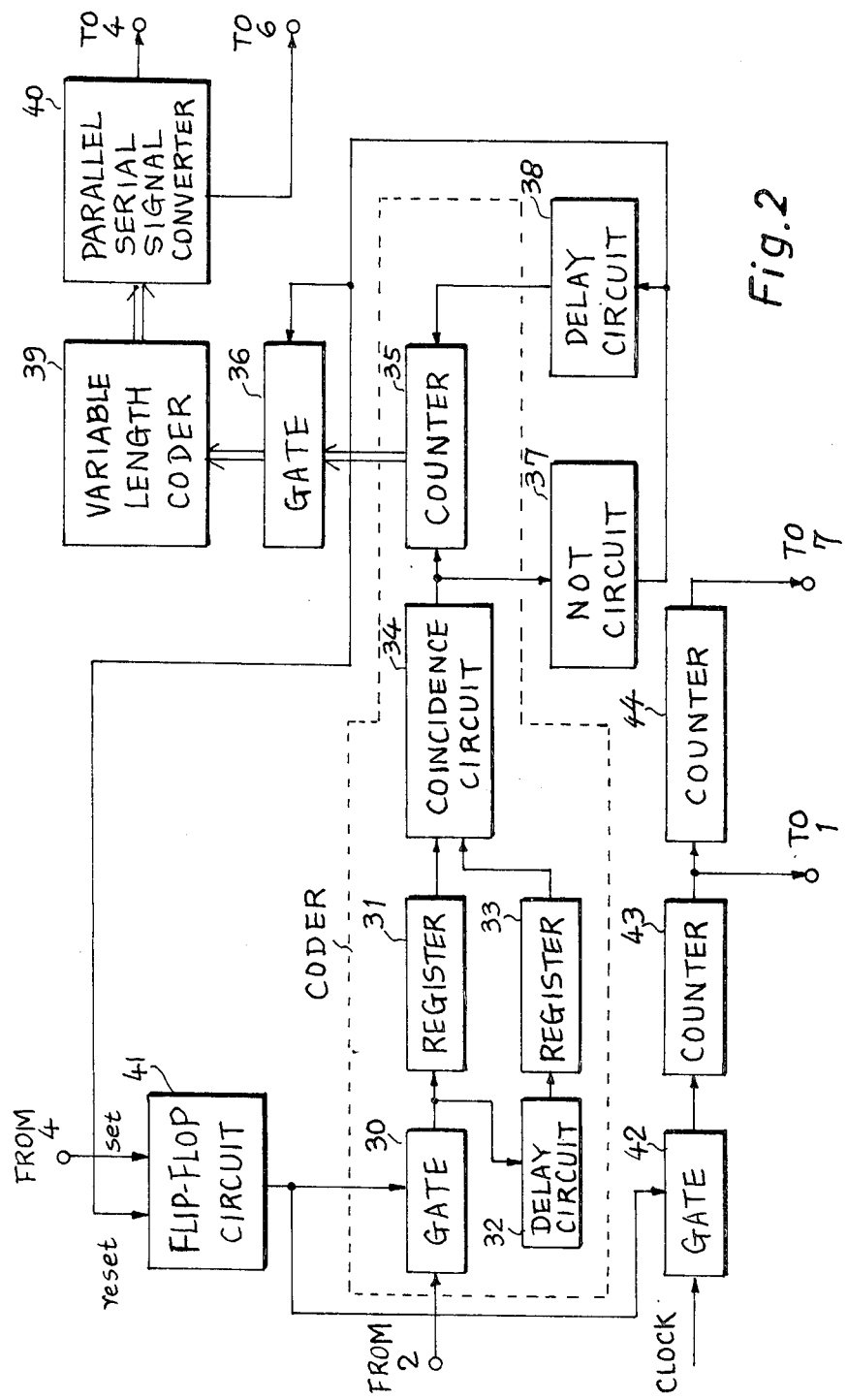
FIG. 2 is a block diagram illustrating an example of the coding section for use in this invention.

FIG. 2 shows in detail an example of the construction of the coding section 3 in FIG. 1. In FIG. 2, the run length coding is exemplified. Reference numeral 30 indicates a gate for receiving a facsimile picture element signal derived from the input buffer memory 2; 31 designates a register; 32 identifies a delay circuit having a delay time corresponding to one picture element; 33 denotes a register; and 34 represents a coincidence circuit which generates a pulse when two inputs thereto are coincident with each other. When an information change picture element in the facsimile signal (a picture element having information different from that of the preceding picture element) arrives at the coincidence circuit 34 from the gate 30, the coincidence circuit 34 generate no pulse. Reference numeral 35 shows a counter for counting the number of picture elements occurring in a time interval between two successive information change picture elements, i.e. a the run length. The circuits 30 to 35 make up a run length coder. Reference numeral 36 refers to a gate; 37 indicates a NOT circuit; 38 designates a delay circuit; and 39 identifies a coder for coding the output of the gate 36 to a variable length code (hereinafter referred to a variable-length coder). Upon detection of the information change picture element by the coincidence circuit 34, the gate 36 is opened by the output pulse from the NOT circuit 37 to apply the value of the run length stored in the counter 35 to the variable-length coder 39, and thereafter the counter 35 is cleared to the state "0" by a pulse applied through the delay circuit 38. In the variable-length coder 39, the value of the run length is converted into a variable length code by known techniques, which code is converted by a parallel-to-serial signal converter 40 into the serial signal and configuration, thereafter is applied to the output buffer memory 4. At the same time as the serial signal is applied to the output buffer memory 4, a timing pulse is supplied from the converter 40 to the counter 6, which counts the pulse to thereby count the number of bits written in the output buffer memory 4. On the other hand, the gate 30 is opened until the coincidence circuit 34 detects the information change picture element and a flip-flop 41 is reset by a pulse from the NOT circuit 37 after the flip-flop 41 is set by a pulse applied from the output buffer memory 4. Further, while the gate 30 is opened, a gate 42 is also opened, and the gate 42 generates a pulse at each reading out of the picture element of the facsimile signal from the input buffer memory 2. Reference numeral 43 identifies a counter which counts the above-said pulses and, when the count value has reached the number of picture elements included in one scanning line, overflows to generate a pulse and is cleared to zero. Since the input to the counter 43 is pulses from the gate 42, the counter 43 generates a pulse when the facsimile signal having passed through the gate 30 corresponds to the end of each scanning line. Reference numeral 44 denotes a counter which when its count value has reached, for example, four, overflows to generate a pulse, and is cleared to zero. At each completion of four scanning lines, a pulse is applied to the comparator 7 from this counter 44.

Figure 3:
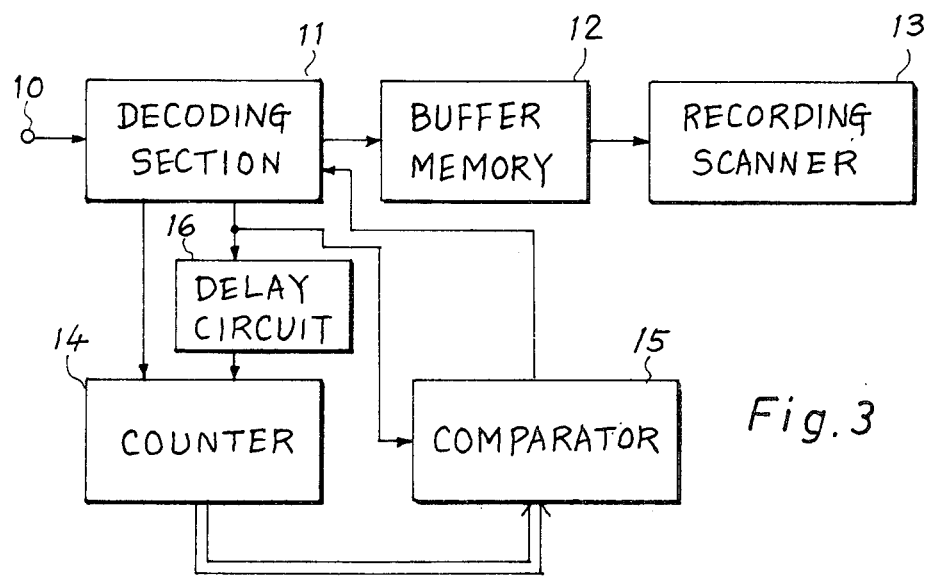
FIG. 3 is a block diagram illustrating an example of a receiving circuit for receiving facsimile signal developed in accordance with this invention.

With reference to FIG. 3, a facsimile receiver for the reception of the coded facsimile signal produced in accordance with this invention will be described. Reference numeral 10 indicates an input terminal for receiving the coded facsimile signal; 11 designates a decoding section for decoding the received coded facsimile signal; 12 identifies a buffer memory for temporarily storing the decoded facsimile signal; 13 denotes a recording-scanner for scanning and recording the content of the buffer memory 12 on a record paper; and 14 represents a counter for counting the number of input bits from the input terminal 10, which counter is cleared to zero by a pulse applied from the decoding section 11 each time when the decoding station 11 decides completion of a predetermined number of scanning lines, that is, x scanning lines. Reference numeral 15 shows a comparator which compares the content of the counter 14 with a predetermined number immediately before the content of the counter 14 is cleared to zero, and when the content of the counter 14 is smaller than the predetermined number, the comparator 15 supplies to the decoding section 11 pulses corresponding in number to the difference; and 16 refers to a delay circuit having a delay time corresponding to the time of one bit.

The operation of the example shown in FIG. 3 is as follows: The coded facsimile signal is applied through the input terminal 10, and is immediately decoded in the decoding section 11. The decoded signal is temporarily stored in the buffer memory 12, and then recorded on the record paper in the recording-scanner 13 at each completion of decoding of each scanning line. On the other hand, when a dummy code is included in the received, coded facsimile signal, the number of bits of the dummy code is detected by the comparator 15 as described later and, in the decoding section 11, the received signal corresponding to the detected number of bits is eliminated by the use of a gate in the decoding section 11 by way of example. The counter 14 counts the number of bits of the facsimile signal from the input terminal 10. After decoding facsimile signals of the predetermined x scanning lines, the decoding section 11 generates a pulse which is applied to the comparator 15. When supplied with the pulse, the comparator 15 compares the count value Z' (the value of Z' being equal to the value of above-mentioned Z of the counter 14, i.e. the number of coded bits received till then, with the predetermined number y. Where the count value Z' of the counter 14 is smaller, that is, the case of $Z' < y$, the comparator 15 supplies to the decoding section 11 pulses corresponding in number to the difference (y − Z') between them, indicating the presence of the dummy code. In the decoding section 11, while it is receiving pulses from the comparator 15, the coded facsimile signals applied through the input terminal 10 are eliminated by the use of a gate therein, by way of example, as dummy codes. In case of $Z' \geqq y$, no dummy code is included in the facsimile signal, so that the comparator 15 generates no pulse. The counter 14 is cleared to zero immediately after the comparator 15 starts its operation. Further, the counter 14 does not count any dummy codes.

An example of the decoding section 11 comprises a conventional binary decoder, such as that disclosed in U.S. Pat. No. 3,588,329, and a gate for eliminating dummy codes as described above.

As described above on the receiving side, the number of bits of coded facsimile signals to be transmitted for the information of x scanning lines is always larger, after added with dummy codes if necessary, than the number of bits to be transmitted within the time necessary for completing subscanning of the x scanning lines at the receiver. Accordingly, the buffer memory (12 in FIG. 3) of the receiver may have a capacity for only x scanning lines. With such an arrangement, it is possible to eliminate the phenomenon of an overflow from the buffer memory due to a low subscanning speed, and to effect continuous receiving and recording.

As has been described in the foregoing, the system of this invention is designed so that if the number of coded output bits of a certain scanning lines is small as a result of coding of facsimile signals so that subscanning on the receiving side cannot follow up the coding, that is, in the case of $Y > Z$, dummy codes are added therewith for each information of the certain number of scanning lines to enable the subscanning on the receiving side to follow up the coding. This operation is very simple, and the capacity required for the output buffer memory in this invention may be the number of bits generated during one coding operation, and hence is remarkedly small.

What we claim is:

1. A facsimile signal transmission system comprising:
    input means for receiving an input facsimile signal;
    coding means connected to said input means for coding said input facsimile signal for each information block of picture elements on a predetermined number of scanning lines and for developing coded outputs;
    counting means connected to said coding means for counting the number of bits of each coded output corresponding to the picture elements of the predetermined number of scanning lines;
    dummy code adding means connected to said coding means and said counting means for adding dummy codes to the coded output of said coding means to increase the number of bits of the coded output to be larger than a reference bit number predetermining in consideration of the subscanning time on the receiving side when the count developed by said counting means is smaller than the reference bit number, said dummy code adding means comprising a comparator connected to said counting means for comparing the count of said counting means with said reference bit number provided therein to develop a pulse when the count of said counting means is smaller than the reference bit number, a dummy code generator for generating dummy codes in response to said pulse from said comparator, and an output buffer memory connected to said coding means, said dummy code generator and said output terminal means for adding to the coded output said dummy codes to develop said coded output with said added dummy codes; and
    output terminal means connected to said dummy code adding means for sending out the coded output of said coding means with said dummy codes added thereto.

2. A facsimile signal transmission system according to claim 1, in which said coding means comprises a coder connected to said input means and said dummy code adding means for coding each information block of picture elements indicative of a run-length from an information change picture element to an immediately succeeding information change picture element.

* * * * *